US008394438B2

(12) United States Patent
Axelrod et al.

(10) Patent No.: US 8,394,438 B2
(45) Date of Patent: Mar. 12, 2013

(54) MOLDED MEAT JERKY

(75) Inventors: Glen S. Axelrod, Colts Neck, NJ (US); Ajay Gajria, Monmouth Junction, NJ (US)

(73) Assignee: T.F.H. Publications, Inc., Neptune City, NJ (US)

( * ) Notice: Subject to any disclaimer, the term of this patent is extended or adjusted under 35 U.S.C. 154(b) by 1288 days.

(21) Appl. No.: 11/670,375

(22) Filed: Feb. 1, 2007

(65) Prior Publication Data

US 2008/0185746 A1    Aug. 7, 2008

(51) Int. Cl.
*A23K 1/18* (2006.01)

(52) U.S. Cl. ........ 426/132; 426/641; 426/513; 426/516; 426/805

(58) Field of Classification Search ............ 426/132, 426/641, 805, 513, 516
See application file for complete search history.

(56) References Cited

U.S. PATENT DOCUMENTS

| | | | |
|---|---|---|---|
| 4,255,379 A * | 3/1981 | Frankland, Jr. ......... 264/328.17 |
| 4,306,848 A * | 12/1981 | Nunn .......................... 425/208 |
| 4,702,929 A | 10/1987 | Lehn et al. |
| 4,892,748 A | 1/1990 | Andersen et al. |
| 4,910,038 A | 3/1990 | Ducharme |
| 5,045,339 A | 9/1991 | Ducharme |
| 5,200,212 A | 4/1993 | Axelrod |
| 5,240,720 A | 8/1993 | Axelrod |
| 5,339,771 A | 8/1994 | Axelrod |
| 5,419,283 A | 5/1995 | Leo |
| 5,476,069 A | 12/1995 | Axelrod |
| 5,827,565 A | 10/1998 | Axelrod |
| 5,941,197 A | 8/1999 | Axelrod |
| 6,056,991 A | 5/2000 | Axelrod |
| 6,067,941 A | 5/2000 | Axelrod |
| 6,083,554 A | 7/2000 | Parker |
| 6,086,940 A | 7/2000 | Axelrod |
| 6,093,427 A | 7/2000 | Axelrod |
| 6,093,441 A | 7/2000 | Axelrod |
| 6,110,521 A | 8/2000 | Axelrod |
| 6,126,978 A | 10/2000 | Axelrod |
| 6,159,516 A | 12/2000 | Axelrod et al. |
| 6,165,474 A | 12/2000 | Frudakis et al. |
| 6,180,161 B1 | 1/2001 | Axelrod |
| 6,238,726 B1 | 5/2001 | Fischer |
| 6,455,083 B1 | 9/2002 | Wang |
| 6,584,938 B2 * | 7/2003 | Sherrill et al. ................. 119/710 |
| 6,586,027 B2 * | 7/2003 | Axelrod et al. ............... 426/132 |
| 6,601,539 B1 * | 8/2003 | Snook .......................... 119/710 |
| 6,815,000 B2 | 11/2004 | Kesler |
| 6,821,538 B2 * | 11/2004 | Axelrod et al. ............... 426/132 |
| 6,916,497 B2 | 7/2005 | Axelrod et al. |
| 7,082,894 B2 | 8/2006 | Sherrill et al. |
| 7,159,510 B2 | 1/2007 | LaMaster |
| 7,288,275 B2 | 10/2007 | Axelrod |
| 7,332,188 B2 | 2/2008 | Axelrod |
| 2002/0185085 A1 | 12/2002 | Sherrill et al. |
| 2004/0151826 A1 * | 8/2004 | Milligan ....................... 426/641 |
| 2005/0153040 A1 | 7/2005 | Axelrod et al. |
| 2006/0062892 A1 | 3/2006 | Merrick |
| 2006/0110500 A1 | 5/2006 | Axelrod |

FOREIGN PATENT DOCUMENTS

| | | |
|---|---|---|
| CA | 1100729 | 5/1981 |
| JP | 54-15961 | 2/1979 |
| JP | 2003-517824 | 6/2003 |

OTHER PUBLICATIONS

International Search Report and Written Opinion dated Jul. 25, 2008 issued in related International Patent Application No. PCT/US08/52688.

English translation of Office Action from corresponding Japanese Application No. 2009-548452 dated Aug. 21, 2012.

* cited by examiner

*Primary Examiner* — Chhaya Sayala

(74) *Attorney, Agent, or Firm* — Grossman, Tucker, Perreault & Pfleger, PLLC

(57) ABSTRACT

A molded animal chew toy including a resin, a fluid such as water, and meat jerky, particularly chicken jerky, is provided. Processes for forming such resin/water/jerky composition into shapes by direct injection molding, including a desired screw design, are also disclosed.

19 Claims, No Drawings

MOLDED MEAT JERKY

TECHNICAL FIELD

The present invention relates to animal chews for dogs, cats and other related animals, and more particularly, to a molded animal chew which may contain chicken jerky or other meat jerky products. The chew may also be enriched with vitamins, minerals and/or herb additives to facilitate the delivery of such ingredients to the animal through the chewing process. The meat jerky may also be incorporated with starch, wheat gluten casein, protein/colloids, rawhide and various other resins in the described molding process.

BACKGROUND

A variety of disclosures exist pertaining to the development of edible dog chews that are digestible, nutritious along with a texture that can be individually adjusted to suit a wide variety of a dog's preferences or needs. Attention is therefore directed to the following exemplary disclosures: U.S. Pat. No. 6,180,161 "Heat Modifiable Edible Dog Chew; U.S. Pat. No. 6,159,516 "Method of Molding Edible Starch; U.S. Pat. No. 6,126,978 "Edible Dog Chew"; U.S. Pat. No. 6,110,521 "Wheat and Casein Dog Chew with Modifiable Texture"; U.S. Pat. No. 6,093,441 "Heat Modifiable Peanut Chew"; U.S. Pat. No. 6,093,427 "Vegetable Based Dog Chew"; 6,086,940 "High Starch Content Dog Chew"; U.S. Pat. No. 6,067,941 "Animal Chew"; U.S. Pat. No. 6,056,991 "Turkey and Rice Dog Chew With Modifiable Texture"; U.S. Pat. No. 5,941,197 "Carrot Based Dog Chew"; U.S. Pat. No. 5,827,565 'Process for Making an Edible Dog Chew"; U.S. Pat. No. 5,339,771 "Animal Chew Toy Containing Animal Meal; U.S. Pat. No. 5,240,720 "Dog Chew with Modifiable Texture"; U.S. Pat. No. 5,200,212 "Dog Chew with Modifiable Texture". Attention is also directed to U.S. Pat. No. 6,165,474 entitled "Application for Patent for Nutriceutical Toy" and U.S. Pat. No. 5,419,283 entitled "Animal Chew Toy of Starch Material and Degradable Ethylene Copolymer".

U.S. Pat. Nos. 6,586,027 and 6,916,497 both entitled "Health Chew Toy" are assigned to the assignee of the present invention and are included herein in their entirety by reference. These patents are directed at molded, completely digestible, nutritious animal chews, enriched with vitamins, minerals and/or herb additives.

While the above certainly contributes to the body of chew products available to an animal, there is nonetheless a need to improve on the above, particularly with respect to heat forming (e.g. molding) and incorporating meat products within such chew products. Accordingly, one object of the present invention is to provide a molded chew toy for an animal that includes meat products such as chicken. In addition, it is also an object of this invention to provide a method of including such meat products in animal chews by extrusion and injection molding.

SUMMARY

A molded animal chew toy is provided which includes meat products in the form of jerky, particularly chicken jerky which may further include vitamin and/or mineral and/or herbal to enrich the chew. The meat products and vitamins, minerals and/or herbal additives may be incorporated into a molded chew toy under conditions that may minimize thermal degradation of such additives and control the moisture content of the meat product portion. The chew toy may be formed by combining resin, a fluid such as water, meat jerky and, optionally, one or a plurality of said vitamins and/or minerals and/or herbs to form a mixture. The resin may include any and all resins that can be made to flow under conditions of elevated temperature and can be molded and cooled into a desired shape. The meat products may include meat jerky including but not limited to chicken, beef, venison, lamb, fish (for instance, tuna and salmon), pork, turkey, alligator, ostrich and elk, or mixtures thereof.

The present invention also broadly relates to a molded animal chew or chew toy comprising meat jerky, particularly chicken jerky, which may be mixed with a resin and a fluid such as water and formed to shape using plastic processing techniques to produce an animal chew which may be stored for long periods of time without refrigeration. The meat jerky and resin may therefore be relatively uniformly distributed in the molded product. Again, the meat jerky may include a mixture of meat products, noted above. Such chews may also include a mixture of denatured and partially hydrolyzed collagen, casein, starch, vegetable matter, rawhide, gluten, soy, rice, potato, peanut bits/flour and/or any other thermoplastic resin. All of the chew toys herein may optionally include flavorings or food coloring.

The molded chew toy of the present invention may also be formed by direct injection molding. It may also be formed by a combination of extrusion and injection molding or by extrusion and cutting to shape. With regard to the direct injection molding process to form the molded chew toy, a modified screw may be used which may include a transition zone that is greater than one-half the length of the feed zone.

DETAILED DESCRIPTION

The present invention relates to the development of a molded resin based edible chew toy for an animal that includes meat products, such as chicken jerky and which may further be enriched with vitamins/minerals and/or herbs to contribute to the overall nutritional needs/requirements of an animal.

Jerky is a very popular form of meat product that may be stored for long periods of time without refrigeration. Meat is generally cut into thin strips with much of the fat trimmed off, then dried. Drying may take place in an oven at relatively low heat so that the product is not cooked, or by sun-drying. Salt and a preservative such may also be added as well as a marinade. By keeping the moisture content relatively low, spoilage may be prevented as microorganism growth may be slowed, particularly if stored in air tight packaging. Accordingly, a meat jerky herein may be understood as a meat that has been previously dried to a moisture content of less than about 40% (wt.), including all values and increments in the range 0.1%-40% (wt.).

Many types of meat may be "jerked" including but not limited to chicken, beef, venison, lamb, fish (for instance, tuna and salmon), pork, turkey, duck, alligator, ostrich, buffalo, pheasant, rabbit, veal and elk.

Combining such jerky products into animal chews and chew toys may provide a greater variety of tasty experiences for pets. Generally, such meat products may be provided to add nutritional value and not just flavoring. Such meat products may be combined with a resin and a fluid such as water in an extruder and subsequently formed into attractive shapes by the injection molding process, or by other plastic molding processes such as compression molding, extrusion, laminating, etc.

Turning first then to the resin component, preferably, the resin may be selected from a material that is capable of flow due to heat and which may be due to heating above an indicated glass transition temperature (Tg) or melting point (Tm). In addition, the resin may be one that provides a molecular weight and/or melt viscosity that allows for the meat jerky (which may remain in a relatively solid particle form) to be relatively uniformly dispersed in the resin during processing (e.g. extrusion or injection molding). The resin may also have an identifiable repeating unit characteristic of a polymer rein.

Accordingly, the resin may be selected from the group consisting of starch, gluten, soy, rice, potato, casein, denatured and partially hydrolyzed collagen, thermoplastic polymers and mixtures thereof. Thermoplastic polymers include polymers such as polyamides and polyurethanes, as well as ethylene copolymers, such as poly(ethylene acrylic acid) and poly(ethylene vinyl alcohol). In addition, instead of a resin component, or in combination with the resin component, one may utilize rawhide, such as comminuted rawhide, as disclosed in U.S. Pat. No. 5,476,069, whose teachings are incorporated herein by reference.

It is contemplated that other fluids than water, particularly relatively low molecular weight fluids (MW≦1000) may be included with a resin and one or more types of meat jerky to assist in plasticating the mixture which may be formed into a molded chew toy. Such fluids may therefore be selected so that they are removed (volatized) during processing due to heat, or they may be designed to remain in the final product.

By way of representative example, in the case of starch, e.g., the process herein may rely upon combining starch with water and a meat jerky to form a mixture such that the mixture is made suitable for melt processing using known plastic processing techniques. In that regard, attention is directed at commonly owned U.S. Pat. No. 6,159,516, whose teachings are incorporated by reference. The process herein may therefore make use of such melt processing techniques and comprises combining starch, meat jerky and water wherein the water content may initially be in the range of greater than about 25%, e.g. in the range of greater than 25% to about 40.0% by weight, introducing and heating said mixture in an extruder wherein the water content of said product upon discharge from said extruder is less than the water content of said product entering said extruder, and introducing the product to a heated injection molding machine and injection molding and cooling to form said molded article wherein the water content is at or below about 25% by weight.

According to the present invention, a meat jerky product, such as chicken, may now be combined with the resin and water in the extruder and still processed to form a moldable composition. Furthermore, the meat jerky component may comprise about 1 to about 90% (wt) of the molded composition, including all values and increments therein. It is also contemplated that the jerky content will be relatively uniformly and homogenously distributed throughout the molded composition. Toward such end, it is contemplated herein that the meat jerky may be present as a plurality of particles having a maximum average cross-sectional diameter of less than or equal to about 0.25 inches including all values and increments therein. For example, the meat jerky particles may have a maximum average cross-sectional diameter of less than or equal to about 0.10 inches, or less than or equal to about 0.005 inches, etc.

The meat jerky may also include a mixture of meat products (e.g. chicken and beef jerky). In such a situation the amount of each jerky component may be varied between 0.1-99%, including all values and increments therein.

Accordingly in connection with the above preferred process, vitamins, minerals and/or herbs may be added with the starch and water prior to extrusion, or may optionally be combined with the starch at that point wherein the starch is to be introduced into, e.g., the injection molding machine for molding, along with the jerky. It is therefore worth noting that in the context of the present invention, it has been appreciated that the vitamins, minerals and/or herb additives herein can be injection molded in the starch/water mixture without substantial thermal degradation of such additives which degradation may attenuate or eliminate their therapeutic effect. In the context of the present invention, it is therefore preferable that at least some portion of the additives remain non-degraded. Those skilled in the art will therefore recognize that in the case of the additives herein, levels as low as 50 ppm would be suitable, including levels between about 50 ppm-1000 ppm, as well as all values and increments therein.

In addition to processing at such temperatures that additives may not be significantly degraded, this process provides a means for providing a chew product containing a meat product wherein the chew product may have a controlled amount of moisture such that the product may be stored, preferably in air tight packaging, for long periods of time without significant spoilage. This approach then allows such meat products and additives to be distributed in a molded chew toy and in a preserved state such that their nutritional or therapeutic value may be maintained.

Accordingly, by incorporating the aforementioned meat jerky and additives in a resin/fluid (e.g., starch/water) combination, the invention herein expands upon the use of water to promote melt mixing of such materials with the starch without significant thermal degradation during plastication (softening for use in a melt-processing operation) in either the extrusion or injection molding equipment. Those skilled in the art will therefore recognize that the amount of water can be readily varied as may be necessary to allow for lower melt processing temperatures to minimize thermal degradation and to provide a product with a controlled amount of water. Preferably, however, the level of added water upon introduction to the extruder may be set at about 20-40% by weight with respect to that of the starch, which may emerge from the extruder at a level of about 15-20%, at which point the extrudate may be in condition for the step of injection molding. Following injection molding, the water level may be set to about 5-20% by weight, and more preferably, 5-15%, and in a most preferred embodiment, the water level of the molded product (including the jerky) may be set to about 11-14%.

Preferably, the molded chew toy of the present invention contains one or more of those vitamins recommended for dogs by the American Association of Feed Control Officials (AAFCO). In the case of dogs, vitamins may comprise A, C, $B_{12}$, D, E, thiamine, riboflavin, pantothenic acid, niacin, pyridoxine, folic acid and choline. In the case of cats, the vitamins may comprise vitamins A, C, $B_{12}$ D, E, and K, thiamine, riboflavin, pyridoxine, niacin, pantothenic acid, folic acid, biotin and choline.

In a preferred embodiment, the molded chew herein may contain vitamins available in the nutraceutical of fermented soya which is made available from Bio Foods, Ltd., Pine Brook, N.J. and sold under the general trademark SOYNATTO, and more specifically SOYNATTO F614 and F625. Preferably, the fermented soya may be present between 0.1-20% (wt.), including all incremental values therebetween with respect to such ranges. In addition, reference is made herein to U.S. application Ser. No. 10/994,524 entitled "Animal Chew Containing Fermented Soyfood" whose teachings are incorporated herein by reference.

In addition, the molded chew toy of the present invention may also comprise minerals. In the case of dogs, the preferred minerals are calcium, phosphorus, potassium, sodium, chloride, magnesium, iron, copper, manganese, zinc, iodine, selenium. However, it is to be noted that other trace minerals have been suggested, such as Co, Mo, Cd, As, Si, V, Ni, Pb and Sn. Furthermore, minerals such as potassium, calcium, phosphorous and magnesium may be required in gram amounts/day, whereas iron, zinc, copper, iodine, and selenium are only required in mg or µg/day. The chew toy herein can therefore be modified to reflect a higher or lower concentration of a given mineral, according to nutritional requirements.

Turning next to the herbal component, the herbs may be selected from the group consisting of St. Johns Wort, Kava Kava, Ginkgo Biloba, Ginseng (Asian or Siberian varieties), Echinacea and mixtures thereof. Other herbs include Catsclaw, Camomile, Golden Seal, Saw Palmetto, Valerina, V. Agnus-Castus, Black Cohosh, Bilberry and Milk Thistle. Herbs may also include aloe, astragalus, burdock, chestnut, coriolus, versicolor, couchgrass, crampbark, dandelion root, dong quai, elecampane, evening primrose, eyebright, false unicorm root, feverfew, garlic ginger, goldenseal, gota kola, grape seed extract, green tea, guggulipid, hawthorn, hops, ivy, licorice, milk thistle, mistletoe (American Asian and European varieties), motherwort, oats, osha, passion flower, pumpkin pygeum, red clover, rosemary, sarsaparilla, skullcap, saw palmetto, stinging nettle, wild indigo, wild yam and yerba mansa. In addition, glucosamines and/or chondroitin can be added to any of the embodiments described herein.

Turning next to a consideration of the incorporation of the vitamins/minerals and/or herb additives of the present invention, it is preferable that such additives may be incorporated at the surface of the molded part, so that they are delivered to the animal prior to the animal's initial loss of interest in the chew toy at issue. In such regard, the present invention contemplates several methods to selectively locate such additives at the surface of the molded product. First, such additives may be selectively concentrated at the surface by a post-molding operation wherein the additives are incorporated into a soaking solution and are allowed to coat and/or penetrate the molded chew toy. Preferably, a water solution containing the vitamins/minerals and/or herbs can be employed.

Alternatively, the present invention contemplates the process of co-injection or insert molding, which allows multiple resins to be injected adjacent one another into one mold to make a single chew toy. In that regard, a starch/jerky formulation without vitamins/minerals and/or herbs may serve as the core of the chew toy and a starch/jerky formulation with said vitamins/minerals and/or herbs may serve as the outer molded surface. The thickness of either the core or surface layer can then be varied according to any desired level.

With reference to such technique of co-injection, it can be appreciated that this uniquely allows for the injection molding of a resin (e.g. starch) outer layer with additives (vitamin, mineral, herb) under conditions wherein the water level may be higher than that of the core. For example, the outer layer formulation may comprise water levels, prior to injection molding of between 10-20%, preferably 15-20%, wherein a starch/jerky mixture for the core is made to contain water levels that are lower than any level selected for the outer layer. This feature of co-injection may therefore provide the ability to control a hardness gradient through the cross-section of the edible chew, with a relatively softer outer surface (e.g. lower Shore Hardness) to a relatively harder inner portion (e.g. higher Shore Hardness), or vice versa.

In addition, when the chew toy of the present invention is in the shape of a conventional dog bone, comprising a center and two end portions, those skilled in the art will recognize that dogs typically first chew the end or "knuckle" portion of the bone. That being the case, the invention herein contemplates selectively concentrating the vitamins/minerals and/or herbs or jerky at an end portion to insure the most efficient delivery of the nutrition to a given animal. This can be preferably accomplished by co-injection or by the aforementioned post-molding soaking process.

In one particularly preferred process of manufacturing the animal chew toy herein, starch, meat jerky and water may be first combined wherein the water content is in the range of 20 to about 40% by weight with respect to that of said starch/jerky. The mixture may be introduced into a vented barrel extruder to form an extruded product which may be reduced in size for further processing, wherein the water content upon discharge from the extruder is less than the water content of said mixture entering the extruder. This extruded product may be in the form of beads or pellets or a sheet which may be cut into chunks for further melt processing. The may be followed by introduction of the extruded beads or pellets or chunks to a heated injection molding machine containing a mold and injection molding and cooling to form the molded article wherein the water content of the molded article is at or below about 25% by weight, wherein the injection molding machine contains a hopper feed section, a barrel and an output nozzle, including a plurality of heating zones in said barrel extending from said hopper section to said nozzle, wherein said plurality of heating zones are set within the following temperature ranges: zone 1=at or below about 70° F.; zone 2=at or below 150° F.; zone 3=at or below about 300° F.; zone 4=at or below about 375° F. Preferably, the mold itself is cooled to about 35-65° F.

In connection with the above, it should be pointed out that the above temperature profile may be most conveniently achieved by the use of cooling coils placed about the barrel of the injection molding machine, where such coils comprise copper cooling coils with circulating water. The advantage of such unique temperature profile, therefore, is that thermal degradation of the components (e.g. starch, meat jerky and the optional nutritional additives noted herein) may be minimized and the water content of the final molded product may be controlled.

In another exemplary embodiment of the present invention, the molded chew toy of the present invention, including one or more meat jerky materials, may be formed by the direct injection molding of the meat jerky. The meat jerky may specifically be a meat jerky that has not been itself exposed to a prior thermal treatment for the purpose of providing a molded product. That is, while the meat jerky may have been heated for drying purposes, and granulated or pelletized, it may represent meat jerky herein that still has not been exposed to a heated/molding type environment that may be found in an extruder or injection molding type machine, and may therefore be understood herein as virgin meat jerky. Accordingly, the meat jerky may again be such that it has an average diameter of less than or equal to about 0.25", including all values and increments therein. In addition, for the direct injection molding contemplated herein, the meat jerky may again be combined with resin and a fluid as noted above. Accordingly, the meat jerky herein may be directly injection molded accordingly to the process disclosed in U.S. application Ser. No. 11/198/881, which is assigned to the assignee of the present invention and included by reference herein in its entirety. As may therefore be appreciated, the jerky, or the resin, fluid and jerky may be introduced directly into the barrel of an injection molding machine and mixed therein to form a composition, foregoing the need to, e.g. mix the ingredients in an extruder and form an intermediate product (bead, pellet, etc.).

In a related exemplary embodiment, a modified screw for direct injection molding may be used according to the teachings of U.S. application Ser. Nos. 11/251,261 and 11/278,735, which are assigned to the assignee of the present invention and included by reference herein in its entirety. The modified screw may include a transition zone having a first length L1 and a feed zone having a second length L2, wherein $L1>0.5*L2$. The modified screw may have a metering zone having a length L3 wherein $L3>0.5*L2$. In addition, the channel depth CD, the distance from the top of a flight to the screw root may be varied in the different sections of the screw. For instance, the feed zone may have a first channel depth CD1 and the metering zone a second channel depth CD2, wherein $CD1>2.0*CD2$.

The modified screw and/or barrel of the injection molding machine may also be specifically coated, which may impart a surface finish value "Ra" greater than 5 micro-inches. The modified screw may also include at least two flights on all or a portion of the screw. One of those flights may be a barrier flight.

One exemplary composition for direct injection molding of a molded edible animal chew may comprise chicken jerky, cellulose/oat fiber, a plasticizer such as glycerin, an emulsifier such as lecithin, and optionally, additives such as vitamins, minerals, omega fatty acids, and flavorants. A resin such as starch may also be present at levels above about 50% (wt.) including all values and increments between 50-99% (wt.). In addition, the plasticizer may be present at about 15% and the emulsifier at levels about 10%.

In another exemplary embodiment of the present invention, a mixture of resin, water and meat jerky may be introduced to a screw conveyor which may be heated. The screw conveyor, which may be an auger type conveyor, may therefore serve to further mix the binder and base components and when heated, as applied to a mixture containing liquid, operates to increase the composition to an overall higher solids level, or stated another way, to a lower moisture level, in connection with those mixtures that contain moisture. It should be noted that the preferred screw/auger type conveyor does not contain a die nor does it develop pressure within a barrel as in conventional extrusion. Furthermore, in the case of a binder that binds the base components in the absence of heat, the screw conveyor may redistribute the binder within the base components so that more effective binding may take place.

Accordingly, the output of the screw conveyor is then fed onto rollers, which may be temperature regulated, which rollers serve to form a sheet material. In that regard, it can be appreciated that the binder and base component may be introduced to two opposed rollers at the location of their circumferential surfaces. As noted, the rollers may optionally be heated or cooled, and each roller may be set to different temperatures and optionally contain a polished or non-stick type surface. Depending upon the spacing between the rollers, the sheet or web of material produced may be formed with a thickness that corresponds to the spacing between the rollers. The rollers therefore serve to press the binder and base component into sheet form and the rollers may optionally be cooled to facilitate such sheet formation. In addition, the rollers themselves may optionally contain grooves and ridges, such that the ridges of one roller enter into the grooves of an opposing roller, thereby providing a cavity to form a ribbon of material. Therefore, the depth of engagement of the ridge into the groove will itself allow one to select the desired thickness for a ribbon of material to be produced, and ultimately cut into final shape. The sheet material so formed of any particular desired thickness may then be delivered to a thermo-regulated chamber, preferably a tunnel, which partially or completely surrounds the sheet and which may provide uniform heating. Accordingly, after the mixture has been shaped and rough sized by the roll mill, the resulting sheet may be discharged from the roll mill onto a conveyor which feeds into the thermo-regulated chamber. Optionally, the conveyor may be chilled to assist in further cooling the sheet prior to further thermo-regulation.

Passing through the aforementioned temperature controlled tunnel may therefore, among other things, serve to additionally harden the composition. In that context, the temperature of the tunnel may be adjusted depending upon the particular final solids level that one may desire, as the temperature of the tunnel serves to further remove liquid, such as moisture, thereby adding to the rigidity of the sheet that is formed. Accordingly, the temperature of the tunnel and the length of time in the tunnel can be conveniently adjusted, depending upon the binder and base components, and the desired moisture level one may wish to achieve in the chew product. In addition, the tunnel may serve to provide cooling for a given selective composition.

The next step of the process may involve cutting to a final desired shape. This can be accomplished in several ways. First, with the objective of forming a rectangular shaped bar, one can initially cut the sheet output along one axis such that the width of the bar is set. Then, a second cutter can be employed to set the length. Alternatively, this may be done in opposite order, or simultaneously. As an alternative to a bar configuration achieved by, e.g. lengthwise splitting and guillotine cutting, the sheet may be formed into different shapes using conventional processes known by those having skill in the art. These shapes may be in the form of chunks of product which may be subsequently be fed to an injection molding machine, further plasticized and molded into more complex shapes. In addition, it is contemplated that such cutting may provide, for example, different shaped articles, such as a dog bone shape, which may be die-cut from the sheet and used without further melt processing. Other cutting and forming methods may also be used to produce various shaped products from the roll formed sheet material. Suitable cutting and forming techniques may include water-jet cutting, hot knife, stamping, etc.

Finally, one may incorporate other types of components to any of the chew toys herein to increase the animal's attraction and/or improve the cosmetic appearance of the molded product. For example, one may optionally incorporate flavorings at a level of 0.1-5% as well as a food coloring. In addition, one may optionally incorporate calcium carbonate which has been found to increase hardness. In addition, one may optionally incorporate a humectant such as oat fiber, in the range of 0.1-5.0%. Further, one may optionally include a preservative, such as sodium benzoate, sodium nitrate or calcium propionate.

In accordance with the present invention, it has been found that it is possible to mix denatured and partially hydrolyzed collagen with meat jerky and another resin, such as casein, starch, vegetable matter, comminuted rawhide, or a synthetic polymer resin, such as a thermoplastic resin, including polyamides and or polyurethanes, as well as ethylene copolymers, such as poly(ethylene acrylic acid) and/or poly(ethylene vinyl alcohol). In such regard, the mixture has been found to lend itself to melt processing under pressure, which includes extrusion, injection molding and/or compression molding techniques. Accordingly, one can prepare injection molded type chew toys herein, comprising meat jerky and denatured and partially hydrolyzed collagen, as well as molded chew toys that combine such collagen with the various components noted above.

In addition, in the case of such mixtures of meat jerky and denatured and partially hydrolyzed collagen with, e.g., vegetable matter, rawhide, casein or starch, it has been found preferable to combine any one of these components at levels of up to 50%, as well as at any percentage between 0.1-50%. Preferably, and by way of representative example, in the case of a mixture with rawhide, it has been found preferable to incorporate about 25% of the denatured and partially hydrolyzed collagen and about 25% meat jerky with rawhide, and in a most preferable form, about 15% of denatured and partially hydrolyzed collagen and about 25% meat jerky mixed with rawhide.

The processes consistent with the present invention may therefore be used for manufacturing edible molded animal treats and/or edible animal chews. Animal treats consistent with the present invention are intended to be fully consumed by a pet or animal. As such, when the desired product is an animal treat it may also be formed from ingredients providing nutritional benefits. Similarly, animal chews consistent with the present invention may be intended to provide nutritional value along with oral health benefits, serving to massage the gums of the pets during the chewing action, etc. Furthermore, as noted earlier, the product herein may alternatively be formed from edible or even non-edible ingredients, wherein the non-edible ingredient may be selected, among other reasons, to provide extended durability when chewed by an animal.

Furthermore, it should also be understood by those having skill in the art, however, that any classification of "treat" or "chew" or "chew toy" as used herein has no bearing on the scope of the invention herein. In addition, it must also be noted that the concept of animal treat or chew herein is not limited and may extend to birds, small mammals, etc.

This invention has been set forth in detail, but it should be understood by those skilled in the art that the various examples herein are by way of illustration only and the features of each example or embodiment may be interchanged. Modifications and variation will therefore be apparent and may be resorted to without departing from the spirit and equivalent scope of this invention. Accordingly, such modifications and equivalents are considered to be within the purview of the scope of the invention as set forth in the following claims.

What is claimed is:

1. A method for forming an edible animal chew toy comprising:
    (a) combining resin, a fluid and meat jerky to form a mixture,
        wherein the meat jerky is produced from meat which has been dried without cooking to a moisture content in a range of 0.1% to 40% (wt.),
        wherein the meat jerky comprises chicken, beef, venison, lamb, fish, pork, turkey, alligator, ostrich or elk and mixtures thereof,
        wherein the meat jerky is virgin meat jerky, and has not been exposed to prior heated molding including extrusion or injection molding, and
        wherein the meat jerky comprises particles having an average cross-sectional thickness from 0.10 inch to 0.25 inch;
    (b) introducing said mixture to a heated molding machine having a hopper feed section, a barrel and an output nozzle, including a plurality of heating zones extending from said hopper feed section to said output nozzle, wherein said plurality of heating zones comprise a first zone set at a temperature at or below about 70° F., a second zone set at a temperature at or below about 150° F., a third zone set at a temperature at or below about 300° F. and a fourth zone set at a temperature at or below about 375° F. and heating, molding and cooling said mixture to form said chew toy having a moisture content in a range of 11% to 14% by weight; and
    wherein the heated molding machine comprises a screw having a feed zone, a transition zone and a metering zone.

2. The method of claim 1 wherein said fluid in said mixture, prior to introduction to said heated molding machine, is present at a level of greater than about 25% by weight.

3. The method of claim 1 wherein said meat jerky is uniformly distributed in said molded chew toy.

4. The method of claim 1 wherein said heated molding machine comprises an injection molding machine or an extruder.

5. The method of claim 1 wherein said meat jerky is present in said molded chew toy at a level of about 1-90% (wt).

6. The method of claim 1 wherein said resin is selected from the group consisting of starch, gluten, soy, rice, potato, casein, denatured and partially hydrolyzed collagen, thermoplastic polymers and mixtures thereof.

7. The method of claim 1 wherein said fluid is water.

8. The method of claim 1 where said resin comprises a mixture of starch and thermoplastic polymer.

9. The method of claim 8 wherein said thermoplastic polymer comprising an ethylene copolymer is selected from the group consisting of poly(ethylene acrylic acid), poly(ethylene vinyl alcohol) and mixtures thereof.

10. The method of claim 1 further including 0.1-20% by weight of fermented soya nutraceutical.

11. A method for direct injection molding meat jerky to produce a molded animal chew, comprising:
    providing an injection molding machine including a screw, a barrel and a mold, wherein the screw comprises a feed zone, a transition zone and a metering zone and wherein the machine further comprises a hopper feed section and an output nozzle, including a plurality of heating zones extending from said hopper feed section to said output nozzle, wherein said plurality of heating zones comprise a first zone set at a temperature at or below about 70° F., a second zone set at a temperature at or below about 150° F., a third zone set at a temperature at or below about 300° F. and a fourth zone set at a temperature at or below about 375° F.;
    introducing meat jerky, a resin and fluid directly into the injection molding machine,
        wherein the meat jerky is produced from meat which has been dried without cooking to a moisture content in a range of 0.1% to 40% (wt.),
        wherein the meat jerky comprises chicken, beef, venison, lamb, fish, pork, turkey, alligator, ostrich of elk and mixtures thereof,
        wherein the meat jerky is virgin meat jerky, and has not been exposed to prior heated molding including extrusion or injection molding, and
        wherein the meat jerky comprises particles having an average cross-sectional thickness from 0.10 inch to 0.25 inch;
    mixing and heating said resin, said meat jerky and said fluid in said molding machine to form a heated composition;
    forming said composition into a molded shape, wherein said molded shape has a moisture content of 11% to 14% by weight.

12. The method of claim 11 wherein said resin is selected from the group consisting of starch, gluten, soy, rice, potato, casein, denatured and partially hydrolyzed collagen, comminuted rawhide, thermoplastic polymers and mixtures thereof.

13. The method of claim 11 wherein said step of introducing said resin, said meat jerky and said fluid directly into the barrel of the injection molding machine further includes incorporating one or more additives.

14. The method of claim 12 wherein said one or more additives comprises 0.1-20% (wt) of a fermented soya nutraceutical.

15. The method of claim 11 wherein said injection machine includes a modified screw, said modified screw comprising a transition zone having a first length L1 and a feed zone having a second length L2, wherein L1>0.5*L2.

16. A method for direct injection molding an animal chew comprising:

introducing a resin, fluid and meat jerky into an injection molding machine including a modified screw, said modified screw comprising a feed zone, a transition zone and a metering zone, said transition zone having a first length L1 and said feed zone having a second length L2, wherein L1>0.5*L2 and wherein the machine further comprises a hopper feed section, a barrel and an output nozzle, including a plurality of heating zones extending from said hopper feed section to said output nozzle, wherein said plurality of heating zones comprise a first zone set at a temperature at or below about 70° F., a second zone set at a temperature at or below about 150° F., a third zone set at a temperature at or below about 300° F. and a fourth zone set at a temperature at or below about 375° F., wherein the meat jerky has is produced from meat which has been dried without cooking to a moisture content in a range of 0.1% to 40% (wt.), wherein the meat jerky comprises chicken, beef, venison, lamb, fish, pork, turkey, alligator, ostrich or elk and mixtures thereof, wherein the meat jerky is virgin meat jerky, and has not been exposed to prior heated molding including extrusion or injection molding, and wherein the meat jerky comprises particles having an average cross-sectional thickness from 0.10 inch to 0.25 inch;

mixing and heating said resin, said fluid and said meat jerky in said machine to form a heated composition; and forming said composition into an animal chew, wherein said animal chew has a moisture content of 11% to 14% by weight.

17. The method of claim 16 wherein said modified screw further comprises a metering zone having a third length L3, wherein L3>0.5*L2.

18. The method of claim 16 wherein said feed zone has a first channel depth CD1 and said metering zone has a second channel depth CD2, wherein CD1>2.0*CD2.

19. The method of claim 16, including combining said meat jerky with an additive, said additive comprising 0.1-20% (wt) of a fermented soya nutraceutical.

* * * * *